United States Patent
Yu et al.

(10) Patent No.: US 8,064,774 B2
(45) Date of Patent: Nov. 22, 2011

(54) HIGH FREQUENCY OPTICAL MILLIMETER-WAVE GENERATION AND WAVELENGTH REUSE

(75) Inventors: Jianjun Yu, Princeton, NJ (US); Dayou Qian, Cranbury, NJ (US); Lei Xu, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 747 days.

(21) Appl. No.: 12/117,347

(22) Filed: May 8, 2008

(65) Prior Publication Data
US 2008/0279559 A1 Nov. 13, 2008

Related U.S. Application Data

(60) Provisional application No. 60/916,632, filed on May 8, 2007.

(51) Int. Cl.
*H04B 10/00* (2006.01)

(52) U.S. Cl. .................................. 398/168; 398/116
(58) Field of Classification Search .............. 398/168, 398/115–117
See application file for complete search history.

(56) References Cited

U.S. PATENT DOCUMENTS

| 3,584,220 A * | 6/1971 | Nomura et al. ............... 398/168 |
| 6,525,855 B1 * | 2/2003 | Westbrook et al. ........... 398/168 |

* cited by examiner

*Primary Examiner* — Leslie Pascal
(74) *Attorney, Agent, or Firm* — Joseph Kolodka

(57) ABSTRACT

A method includes generating an optical millimeter wave signal for modulation of a first data signal, and deriving from the generated optical millimeter wave signal a subsequent light source for modulation of a second data signal. More specifically the generating includes modulating a light wave to a multiple of a frequency of an oscillating signal. Alternatively, the generating includes modulating a data signal mixed with an oscillating signal to a multiple of a frequency of the oscillating signal. The deriving includes modulating a frequency component filtered from a data modulation of the generated optical millimeter wave signal.

13 Claims, 2 Drawing Sheets

HIGH FREQUENCY OPTICAL MILLIMETER-WAVE GENERATION AND WAVELENGTH REUSE

This application claims the benefit of U.S. Provisional Application No. 60/916,632, entitled "Centralized Lightwave Radio-Over-Fiber System with High-Frequency Optimal Millimeter-Wave Generation by Low-Frequency and Low-Bandwidth Optical and Electrical Sources", filed on May 8, 2007, the contents of which is incorporated by reference herein.

BACKGROUND OF THE INVENTION

The present invention relates generally to optical communications and, more particularly, to high frequency optical millimeter wave generation and wavelength reuse.

To construct a simple base station and to generate a low-cost optical millimeter wave (mm-wave) there are two key technologies required to make radio-over-fiber (ROF) systems practical for commercial deployment. Schemes of wavelength reuse or centralized lightwave in a central office have been proposed and experimentally demonstrated. The common characteristic in the previous scheme is that the electrical local oscillator (LO) frequency for generating the optical mm-wave is half of the spacing between two first-order sidebands. For example, for a 40-GHz optical mm-wave generation, the LO frequency is 20 GHz, and the bandwidth for the external modulator (EM) also requires 20 GHz. To further reduce the requirement of LO frequency and bandwidth of the EM and reduce the overall cost, it has already been proposed by others to generate an optical mm-wave by a multiple double-frequency technique through properly adjusting DC bias on the EM. Optical mm-wave signals up to 50-GHz have been generated using this method. However, this technique cannot provide the function of wavelength reuse.

Accordingly, there is a need for a simplified technique to generate optical mm-wave signals and wavelength reuse.

SUMMARY OF THE INVENTION

In accordance with the invention, a method includes generating an optical millimeter wave signal for modulation of a first data signal, and deriving from the generated optical millimeter wave signal a subsequent light source for modulation of a second data signal. More specifically the generating includes modulating a light wave to a multiple of a frequency of an oscillating signal. Alternatively, the generating includes modulating a data signal mixed with an oscillating signal to a multiple of a frequency of the oscillating signal. The deriving includes modulating a frequency component filtered from a data modulation of the generated optical millimeter wave signal.

In accordance another aspect of the invention, a method includes generating an optical millimeter wave signal for modulation of a data signal to be wirelessly transmitted, and deriving from the generated optical millimeter wave signal a light source for modulation of a received wireless signal to be optically transmitted. More specifically the generating includes modulating a light wave to a multiple of a frequency of an oscillating signal. Alternatively, the generating includes modulating a data signal mixed with an oscillating signal to a multiple of a frequency of the oscillating signal. The deriving includes modulating a frequency component filtered from a data modulation of the generated optical millimeter wave signal.

BRIEF DESCRIPTION OF DRAWINGS

These and other advantages of the invention will be apparent to those of ordinary skill in the art by reference to the following detailed description and the accompanying drawings, where like elements are like numbered when appearing in more than one drawing figure.

DETAILED DESCRIPTION

The application is directed to generating a centralized lightwave for full-duplex ROF architecture while generating a high-frequency millimeter wave (mm-wave) with multiple double-frequency of that of the LO signal, using the inventive technique for generating optical mm-wave signals.

Figure 1:
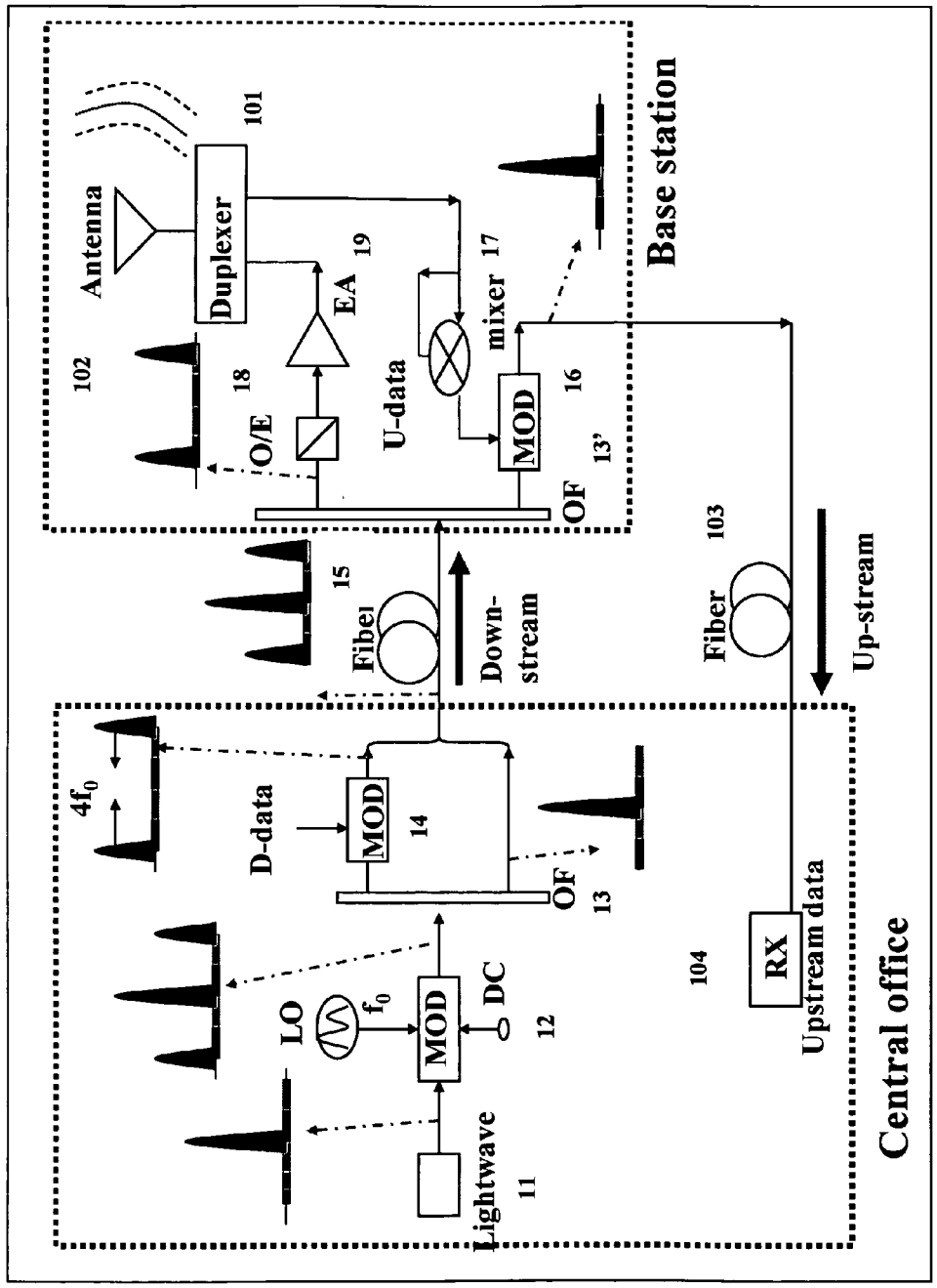
FIG. 1 is a block diagram of an exemplary radio on fiber configuration, employing optical millimeter wave generation and wavelength reuse in accordance with the invention.

Referring to the block diagram 10, FIG. 1, there is shown an exemplary radio on fiber configuration including a lightwave source 11; a local oscillator LO at frequency $f_o$; external modulators (MOD), 12, 14, 16; a direct current (DC) 12; optical filters OF 13, 13'; downstream data, D-data; a downstream transmission fiber 15; upstream data, U-data; mixer 17, optical-to-electrical converter, OE 18; electrical amplifier, EA, 19; duplexer 101, antenna 102, up-stream fiber 103; and receiver, RX, 104.

Referring again to FIG. 1, an LiNbO$_3$ external modulator MOD 12,14 and a cascaded optical filter 13 are employed to generate an optical millimeter wave (mm-wave) which is also used to providing a lightwave source for upstream data modulation. To realize an optical mm-wave carrier with four times that of the local oscillator LO frequency, the modulator 12 needs to be DC-biased at the top peak output power when the local oscillator LO signal is removed. If the repetitive frequency of the radio-frequency (RF) microwave source is $f_0$, the first-order modes are suppressed and the frequency spacing between the second-order modes is equal to $4f_0$, as shown at the output of the second modulator 14. Here we assume that the MOD is an ideal one with symmetrical DC-biased performance. Therefore, the first-order sidebands can be completely suppressed. Then we employ an optical filter 13 such as an optical fiber grating, regular tunable optical filter or optical interleaver to separate the optical carrier from the two second-mode sidebands. The downstream data are carried over the downstream fiber 15 by the second-mode sidebands via an EM. Then the modulated mm-wave signals are combined with the optical carrier by using an optical coupler (OC) before they are delivered to the BS.

In the BS, the optical mm-wave signals are separated from the optical carrier by an optical filter 13'. The optical mm-wave signals are detected by a high-speed receiver or optical-to-electrical converter OE 18 before they are boosted by a narrow-band electrical amplifier (EA) 19. Then the mm-wave signals are broadcasted via a duplexer 101 to the customer unit by using an antenna 102. On the other hand, the upstream data received by the antenna is down-converted by using an electrical mixer 17. The down-converted upstream data are modulated in an external modular 16 before the upstream optical signals are delivered over the upstream fiber 103 to the receiver RX 104 at the central office CO.

Figure 2:
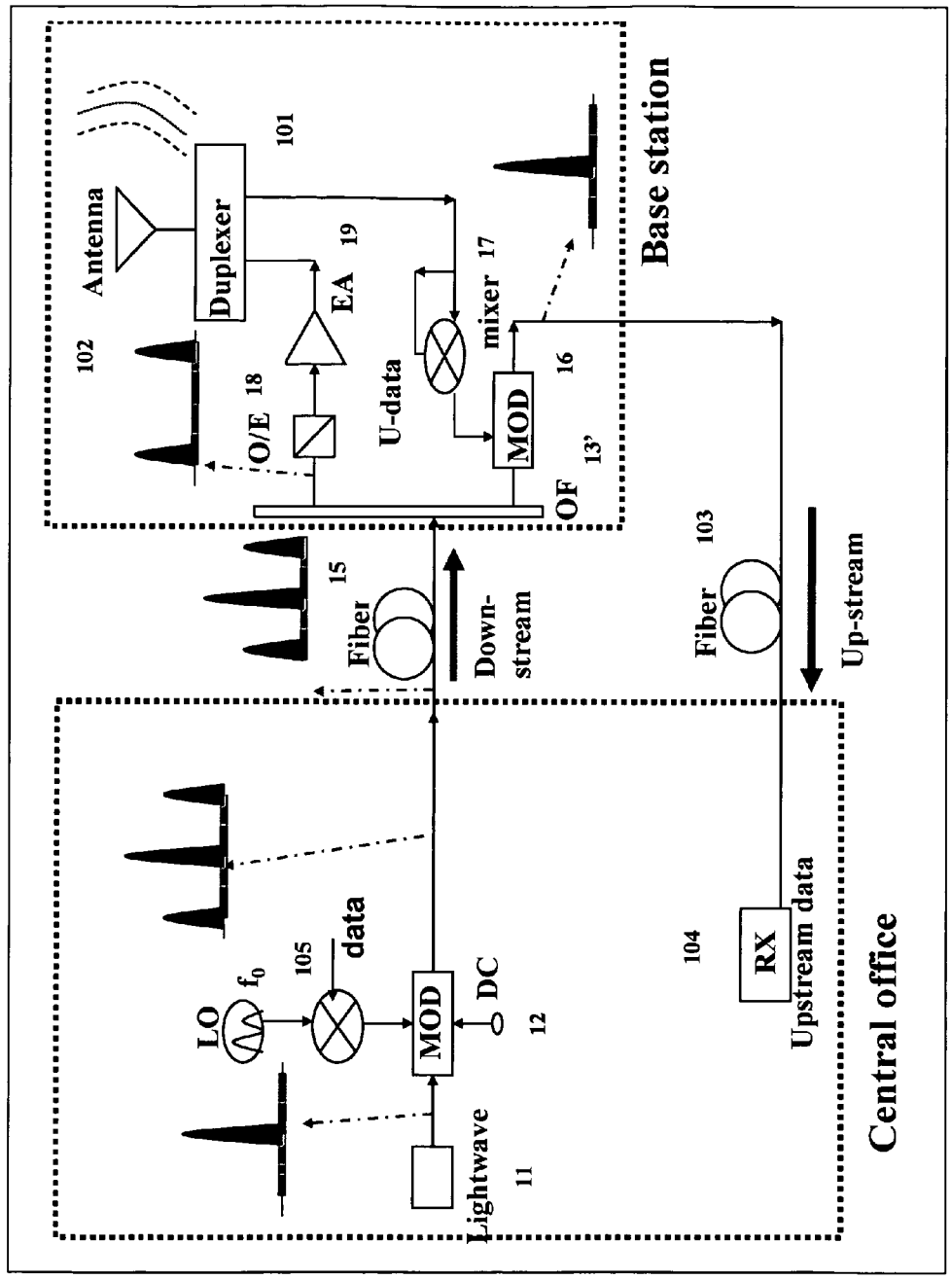
FIG. 2 is a block diagram of an alternative exemplary radio on fiber configuration, employing optical millimeter wave generation and wavelength reuse in accordance with the invention.

Referring now to the block diagram 20 of FIG. 2, there is shown an alternative optical configuration for generating optical millimeter wave mm-wave signals according to the invention. This configuration 20 is similar to the configuration 10 of FIG. 1, except the generation of the optical mm-wave signals in the central office is different. In the alternative configuration 20, the electrical RF signals are generated by using an electrical mixer 105 in conjunction with the modulator 12 and local oscillator Lo stage. The radio frequency RF signals of the downstream data are used to drive the external modulator 12. The modulator is DC-biased at the same condition as that in FIG. 1. This technique is much simpler compared to that of FIG. 1, but the optical carrier will carry a part of downstream data signal, and these signals will degrade the upstream signals. However, this second configuration 20 is more cost-effective than the first configuration.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method comprising the steps of:
  generating an optical millimeter wave signal for modulation of a first data signal; and
  deriving from the generated optical millimeter wave signal a subsequent light source for modulation of a second data signal, said deriving including modulating a frequency component filtered from a data modulation of the generated optical millimeter wave signal.

2. The method of claim 1, wherein the generating step comprises modulating a light wave to a multiple of a frequency of an oscillating signal.

3. The method of claim 2, wherein the oscillating signal is a microwave frequency and the multiple is four times the microwave frequency.

4. The method of claim 1, wherein the generating step comprises modulating a data signal mixed with an oscillating signal to a multiple of a frequency of the oscillating signal.

5. The method of claim 4, wherein the oscillating signal is a microwave frequency and the multiple is four times the microwave frequency.

6. The method of claim 1, wherein the deriving step comprises modulating a center frequency component filtered from the generated optical millimeter wave signal modulated by data.

7. A method comprising the steps of:
  generating an optical millimeter wave signal for modulation of a data signal to be wirelessly transmitted; and
  deriving from the generated optical millimeter wave signal a light source for modulation of a received wireless signal to be optically transmitted, said deriving including modulating a frequency component filtered from a data modulation of the generated optical millimeter wave signal.

8. The method of claim 7, wherein the generating step comprises modulating a light wave to a multiple of a frequency of an oscillating signal.

9. The method of claim 8, wherein the oscillating signal is a microwave frequency and the multiple is four times the microwave frequency.

10. The method of claim 7, wherein the generating step comprises modulating a data signal mixed with an oscillating signal to a multiple of a frequency of the oscillating signal.

11. The method of claim 10, wherein the oscillating signal is a microwave frequency and the multiple is four times the microwave frequency.

12. The method of claim 7, wherein the deriving step comprises modulating a center frequency component filtered from the generated optical millimeter wave signal modulated by data.

13. A method comprising the steps of:
  generating an optical millimeter wave signal for modulation of a first data signal; and
  deriving from the generated optical millimeter wave signal a subsequent light source for modulation of a second data signal, said deriving including modulating a center frequency component filtered from the generated optical millimeter wave signal modulated by data.

* * * * *